United States Patent
Edstrom (10) Patent No.: US 11,213,751 B2
(45) Date of Patent: *Jan. 4, 2022

(54) CONTROLLING A USER INTERFACE OF A COMPUTER DEVICE

(71) Applicant: KING.COM LIMITED, St. Julians (MT)

(72) Inventor: Marcus Edstrom, Malmo (SE)

(73) Assignee: KING.COM LTD., St. Julians (MT)

( * ) Notice: Subject to any disclaimer, the term of this patent is extended or adjusted under 35 U.S.C. 154(b) by 126 days.

This patent is subject to a terminal disclaimer.

(21) Appl. No.: 16/662,747

(22) Filed: Oct. 24, 2019

(65) Prior Publication Data
US 2020/0054948 A1    Feb. 20, 2020

Related U.S. Application Data (63) Continuation of application No. 15/054,734, filed on Feb. 26, 2016, now Pat. No. 10,463,963.

(51) Int. Cl.
*A63F 13/537* (2014.01)
*A63F 13/35* (2014.01)
*A63F 13/795* (2014.01)

(52) U.S. Cl.
CPC ............ *A63F 13/537* (2014.09); *A63F 13/35* (2014.09); *A63F 13/795* (2014.09)

(58) Field of Classification Search
CPC ....... A63F 13/537; A63F 13/795; A63F 13/35
See application file for complete search history.

(56) References Cited

U.S. PATENT DOCUMENTS

| | | | |
|---|---|---|---|
| 10,463,963 B2* | 11/2019 | Edstrom | A63F 13/537 |
| 2005/0245304 A1 | 11/2005 | Takeda et al. | |
| 2008/0167122 A1 | 7/2008 | Maeda et al. | |
| 2009/0088235 A1* | 4/2009 | Stein, III | A63F 9/24 463/9 |
| 2009/0093313 A1 | 4/2009 | Yabuki et al. | |
| 2013/0263055 A1* | 10/2013 | Victor | G06F 3/04842 715/835 |
| 2014/0080559 A1* | 3/2014 | Knutsson | G07F 17/3274 463/10 |
| 2014/0128137 A1* | 5/2014 | Balise, III | A63F 13/005 463/10 |

OTHER PUBLICATIONS

"A (real) high score reset?", Pinside.com; retrieved from the Internet; retrieved May 14, 2018: URL:https://pinside.com/pinball/forum/topic/a-real-high-score-reset, 2014.

* cited by examiner

*Primary Examiner* — Thomas J Hong
*Assistant Examiner* — Carl V Larsen
(74) *Attorney, Agent, or Firm* — Saul Ewing Arnstein & Lehr LLP (57) ABSTRACT

A computer device has a display and a user interface which detects user input. A memory stores information about other users and their associated game progress information. When a game with a game parameter is started, the processor will change the game parameter depending on the stored information. The updated parameter is displayed.

24 Claims, 8 Drawing Sheets

| User ID | Game ID | Level information | High score | User 1 information | Level information | ...... | User information | Level information |
|---|---|---|---|---|---|---|---|---|
| 800 | 802 | 804 | 806 | 808 | 810 | | 812 | 814 |

CONTROLLING A USER INTERFACE OF A COMPUTER DEVICE

CROSS-REFERENCE TO RELATED APPLICATIONS

This application is a continuation of U.S. application Ser. No. 15/054,734, filed Feb. 26, 2016, the entire contents of which being fully incorporated herein by reference.

FIELD OF THE INVENTION

The present invention relates to controlling a user interface responsive to user engagement with displayed elements on the interface of a computer device. The embodiments may have particular, but not exclusive application in the field of computer implemented applications including for example games and computing devices therefor.

BACKGROUND OF THE INVENTION

In the field of computer-implemented games, there are many technical challenges facing the designer of such games when considering how the user interface is to be controlled in the context of computer devices available to play the game.

One technical challenge can involve allowing a game to be fun and compelling even when there is limited display resource available, such as when a game is being played on a smartphone, tablet or other minicomputer.

Another significant technical challenge is how to retain casual game play where a user is able to play a game as and when they like while at the same time having an aspect which involves interaction with other players.

A common genre of casual games is so-called match games. This is a type of tile-matching game where the player manipulates tiles or game objects according to a matching criterion.

A match-three game is a type of casual puzzle game where the player is required to find patterns on a seemingly chaotic board. The player then has to match three or more of the same type of game element on the game board and those matched elements will then disappear. An existing type of match-three game is a so-called "switcher" game. In a switcher game, the player switches place onto adjacent game elements on the game board so that one or both of them create a chain of at least three adjacent game elements of the same type. Those matched game elements will then disappear. The game board is then repopulated with game objects.

One such known match three-type game is known by the trade name Candy Crush. In that game, the game board is repopulated with game elements which are perceived as falling downwards onto the game board from the top edge of the screen from which the game is played.

Another known type of game is "linker game", where a sequence of game elements are linked to form a known sequence. Another type of game is a 'clicker' game, in which matches can be made in a board by clicking adjacent game elements.

Another genre of casual games are computer implemented card games for example solitaire type games.

A technical challenge exists when introducing complexity into such casual games.

SUMMARY OF THE INVENTION

According to an aspect, there is provided a computer device having: a display configured to display a game area for a computer implemented game; a user interface configured to detect user input when a user engages with the game area; a memory storing information about at least one other user and respective progress information associated with the at least one other user; and at least one processor configured to receive a detected user input to start the computer implemented game having an associated game parameter, to change the associated game parameter in dependence on the stored information about at least one other user and the respective associated progress information and to cause the display to display information on the changed game parameter.

The game parameter may comprise a number of available moves.

The computer implemented game may have a plurality of levels and the user input to start the game may comprise an input to select one of the levels.

The progress information may comprise level information and the at least one processor may be configured to determine a level of the plurality levels of the user and to select at least one other user in dependence on a respective level of the other user and the level of the user.

The at least one processor may be configured to determine for a respective other user if a difference between the level of the user and the level of the respective other user is less than a threshold and if so to select the respective other user.

The at least one processor may be configured to change the parameter by a value dependent on a selected number of other users.

The at least one processor may be configured to control the display to display a representation of at least one other user in a first game area.

The at least one processor may be configured to control the display to display in the first game area a plurality of available levels of the game and respective visual indications indicating for the user and at least one other user a respective current level.

The at least one processor may be configured to control the display to display a representation of at least one other user moving to a current level of the user.

The computer device may comprise a receiver configured to receive at least one of the information about the at least one other user and the respective progress information.

The at least one processor may be configured to start the game in response to the detected user to start the game and to display a second game area, the second game area comprising an area to display the game parameter, the at least one processor may be configured to cause the display to display the game parameter changing in conjunction with visual representations of the at least one other user.

According to another aspect, there is provided a computer implemented method comprising: displaying on a display a game area for a computer implemented game; detecting user input at a user interface when a user engages with the game area; storing information in a memory about at least one other user and respective progress information associated with the at least one other user; receiving by at least one processor the detected user input to start the computer implemented game having an associated game parameter; changing by the at least one processor the associated game parameter in dependence on the stored information about at least one other user and the respective associated progress information; and displaying on the display information on the changed game parameter.

The game parameter may comprise a number of available moves.

The computer implemented game may have a plurality of levels and the user input to start the game may comprise an input to select one of the levels.

The progress information may comprise level information and the method may comprise determining by the at least one processor a level of the plurality levels of the user and selecting at least one other user in dependence on a respective level of the other user and the level of the user.

The method may comprise determining by the at least one processor for a respective other user if a difference between the level of the user and the level of the respective other user is less than a threshold and if so selecting the respective other user.

The computer implemented method may comprise changing the parameter by a value dependent on a selected number of other users.

The method may comprise displaying a representation of at least one other user in a first game area.

The computer implemented method may comprise controlling the display to display in the first game area a plurality of available levels of the game and respective visual indications indicating for the user and at least one other user a respective current level.

The method may comprise controlling the display to display a representation of at least one other user moving to a current level of the user.

The method may comprising receiving at least one of the information about the at least one other user and the respective progress information.

The method may comprising starting by the at least one processor the game in response to the detected user to start the game and displaying a second game area, the second game area comprising an area to display the game parameter, and displaying on the display the game parameter changing in conjunction with visual representations of the at least one other user.

According to another aspect, there is provided a computer-readable non-transitory storage medium carrying one or more sequences of instructions which when executed on a processor of a computer, cause: displaying on a display a game area for a computer implemented game; detection of user input at a user interface when a user engages with the game area; starting of the computer implemented game having an associated game parameter; changing the associated game parameter in dependence on stored information about at least one other user and respective associated progress information; and displaying on the display information relating to the changed game parameter.

A further aspect provides computer program products for implementing the afore-defined methods.

DESCRIPTION OF DRAWINGS

Embodiments of the invention will now be described by way of the accompanying drawings in which.

DESCRIPTION OF EMBODIMENTS

The terms user and player are used interchangeably throughout this document and no specific meaning is intended using one or the other unless the context suggests otherwise.

In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

A person skilled in the art will realise that the different approaches to implementing the game is not exhaustive, what is described herein are certain preferred embodiments. It is possible to implement the way in a number of variations without departing from the spirit or scope of the invention.

Embodiments may be used in conjunction with any so-called casual game, some examples of which have been previously mentioned.

Figure 6:
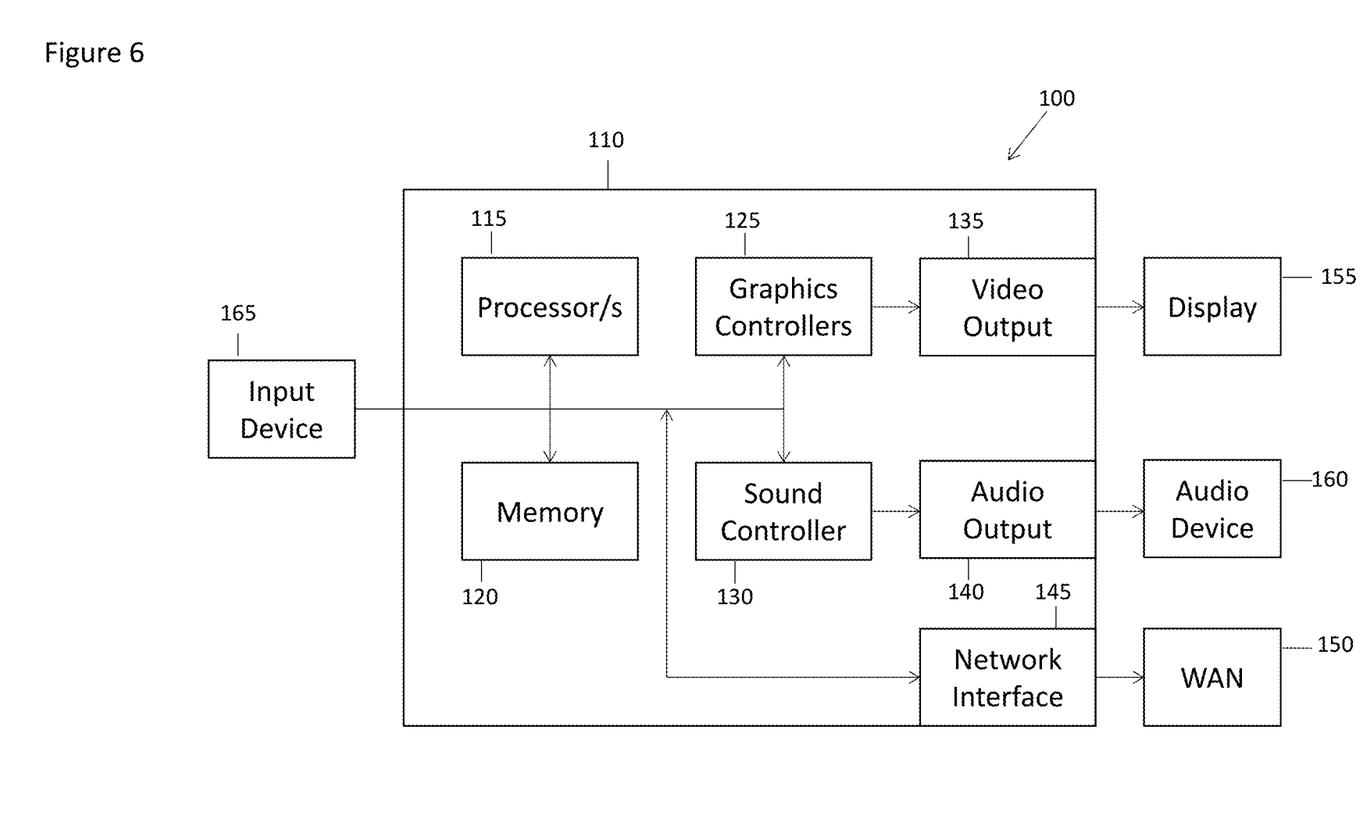
FIG. 6 shows an example user device in which some embodiments may be provided.

A schematic view of a user device 100 according to an embodiment is shown in FIG. 6. All of the blocks shown are implemented by suitable circuitry. The blocks may be implemented in hardware and/or software. The user device may have a control part 110. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio out 140 is provided to an audio device 160 such as a speaker and or earphone(s).

The device 100 has an input device 165. The input device can take any suitable format and can be one or more of a keyboard, mouse, touch screen, joystick or game controller. It should be appreciated that the display 155 may in some embodiments also provide the input device 165 by way of an integrated touch screen for example The blocks of the controller 110 are configured to communicate with each other by an interconnect such as a bus or any other suitable interconnect and/or by point to point communication.

It should be appreciated that in some embodiments, the controller may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 7:
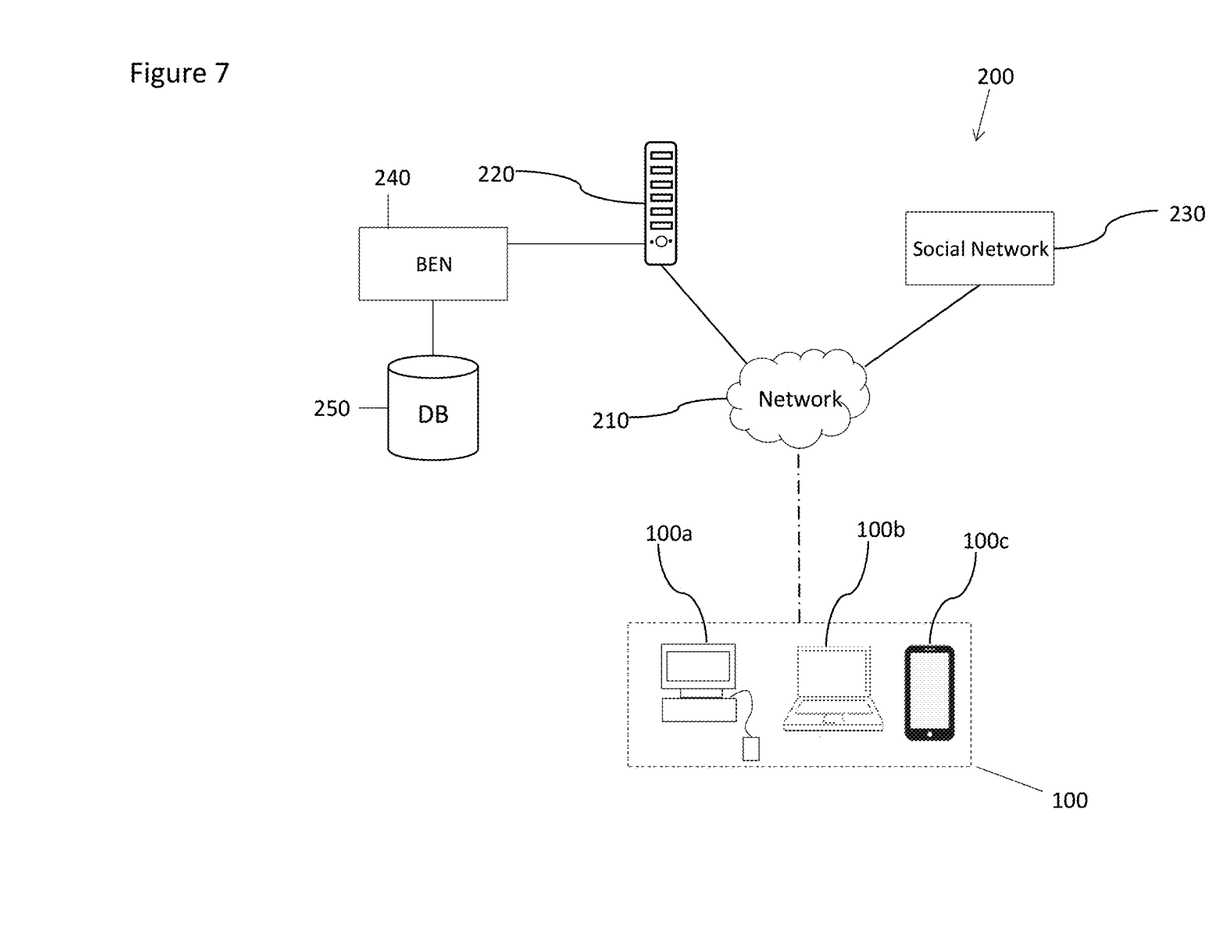
FIG. 7 shows an example system in which some embodiments may be provided.

FIG. 7 schematically shows a system 200 according to an embodiment. The system 200 comprises a server 220 which may store or be in communication with database 250 which may be, in some embodiments, be connected to a back end infrastructure (BEN) 240 of game player's details, profiles, statistics etc. In practice, one or more databases 250 may be provided. Where more than one server 220 is provided, the database(s) 250 may be provided in one database 250 or across two or more servers. The server 220 may also have a games data function. This may comprise one or more units of memory to store the computer game program, user behaviour data and a processor 115 to run the games program and process the user behaviour data.

The server 220 may communicate via, for instance, the internet 210 to one or more client or user devices 100, shown in FIG. 6 by way of example as user devices 100a, 100b and 100c, and may further provide connections to a social network 230, for example, Facebook™. The social network 230 may also be connected to a database 270 storing social user interaction details, for instance, user to user interaction maps, friend lists, location history etc. In practice, one or more databases 270 may be provided.

It should be appreciated that embodiments may be deployed in different system architectures. For example, the computer game may be implemented as a computer game that is stored in the memory of the user device and is run on the processor of the user device. However, the server 320 may handle some elements of the game in some embodiments. By way of example only, a Java game applet may be provided to the user device 200 and the locally running Java applet will generate, for example, the graphics, sounds, and user interaction for the game play on the user device. Some data may be fed back to the server to allow interaction with other players 305. The data which is fed back may alternatively or additionally allow scoring and/or cross platform synchronization.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

It should be appreciated that some embodiments may be provided as stand-alone games on the user device.

Figure 1A:
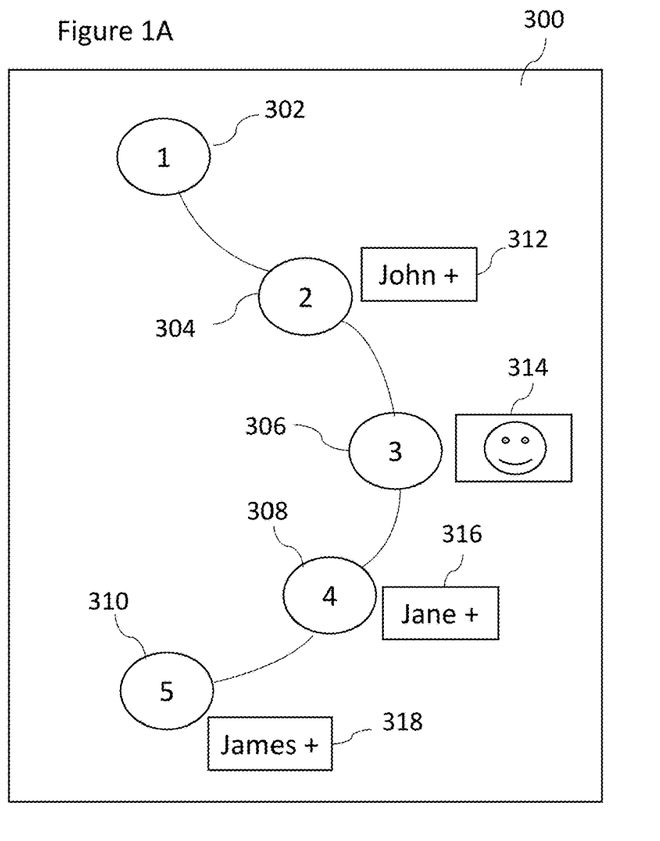
FIGS. 1A and 1B show views, as displayed on a display of a user device, of a game having a number of levels.
Figure 1B:
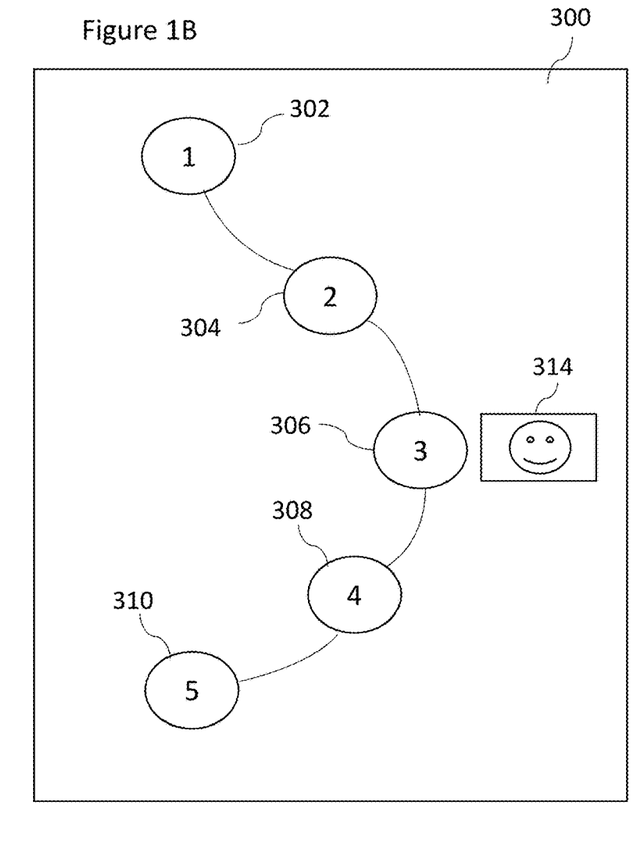

In some embodiments a viewable map 300 is rendered on a user device on which shows a plurality of levels or locations. In the example shown in FIGS. 1A and 1B, there are five locations 302, 304, 306, 308, and 310. The number of locations or levels shown in FIGS. 1A and 1B is by way of example and different numbers of locations may be displayed in other embodiments. Each location is associated with a particular game board having particular game objectives which are rendered for a user on the display of his user device when he selects a location icon associated with a particular location.

In some embodiments, a player must complete the game objective presented to him at each level before he can pass to the next level. In some embodiments, a player may replay levels or be required to replay levels until a given objective is achieved.

At each level, the player plays the game by himself (so-called solo play). In Saga format games, a player's 'friends' can be rendered visible on the map at their last played level. In the example shown in FIG. 1A, representations 312, 316 and 318 associated with three friends are displayed. In the example shown, the representation comprises the "friends" name: John, Jane and James respectively. In some embodiments, the representation may alternatively or additionally comprise an avatar.

In the example shown in FIGS. 1A and 1B, the player has a representation 314 shown at the player's current location in the game, which in this example is level 3. It should be appreciated that in some embodiments, a different visual indicator may be used to show the level which the player has reached. For example, the level number and/or image representing the level may be displayed in a visually distinct manner. The avatar and/or other image may not be provided in some embodiments.

A technical problem arises in how to enable a user to interact more with his friends when they are playing the game at different times.

In some embodiments, when the player selects the level that he is to play, the representations of other players in neighbouring levels are graphically represented as being moved into to the selected level of the player. For example, the representation 312 representing John is visually displayed as moving across the display and going into level 3, referenced 306. Likewise, the representation 316 representing Jane likewise is moved across the screen and goes into level 3. Finally, the representation 318 representing James is also shown as moving across the display level 3.

FIG. 1B shows the image which is displayed after the representations of the other users have moved into level 3—only the representation of the player 314 is shown at level 3. This is to visually represent to the user that the other users are now associated with the level played by the player. In some embodiments, this may consist of in game assistance being provided to the player. Each of the visual representations of the other players is shown with a "+" mark. This is to visually represent that each of these other players appears to provide the player, when he plays level 3, with an extra move when playing this level.

It should be appreciated that the in game assistance which appears to be provided by the other players may be dependent on the game and/or level being played. In this example the in game assistance is an extra move. It should be appreciated that in some embodiments, more than one extra move may be provided by each other player to the player of the level. The in game assistance which appears to be provided by a particular other player may alternatively or additionally be one or more of extra time, one or more booster functions, one or more extra life, in game currency and the like. Different in game assistance may be provided by the other players to a user playing a particular level.

Figure 2A:
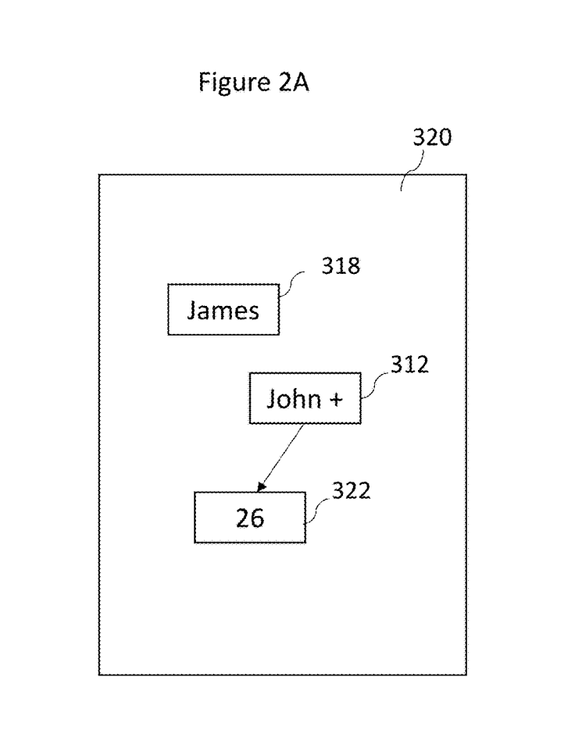
FIGS. 2A to 2C are schematic views illustrating how a number of moves is increased.
Figure 2B:
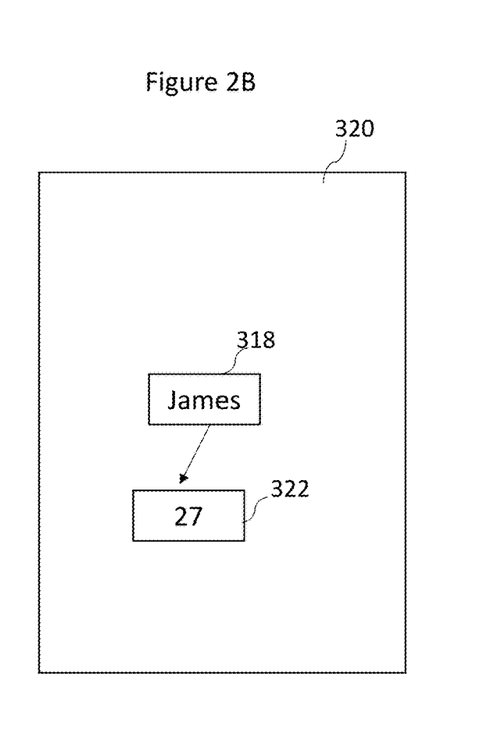
Figure 2C:
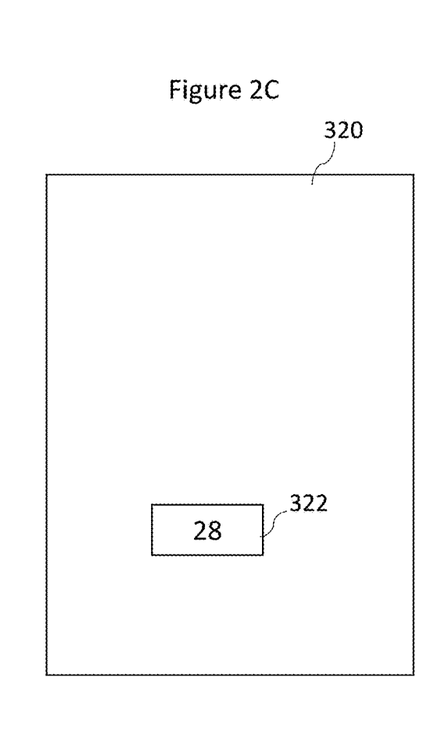

Reference is made to FIGS. 2A to 2C. These Figures schematically show part of the game area which is displayed. The successive images represented by of FIGS. 2A, 2B and 2C are displayed, after the images as shown and discussed in relation to FIGS. 1A and 1B. In summary, when a level is selected, the representations of the other users are shown as moving into a level (as discussed in relation to FIGS. 1a and 1b) and then the image changes to the "in-game" view—in other words the screens which are shown allow the user to start to play the level.

The displayed game area comprises a value area 322. In FIG. 2A, the value is indicated as 26. This value represents the number of moves available to the user when playing this level. This value is defined by the game code. It should be appreciated that this number of moves is of course by way of example only.

As can be seen in FIG. 1A, a representation 318 of the James and a representation 312 of John is shown. The representation 312 of John is visually shown moving into the value area 322. As shown in FIG. 2B, the value in the value area 322 has increased by one to 27 and the representation 312 of John is no longer shown. The representation 318 of James is visually shown moving into the value area 322. As shown in FIG. 2C, the value in the value area 322 has increased by one to 28 and the representation 318 of James is no longer shown.

For simplicity, this example only shows two of the representations of the other users. In some embodiments, all of the other players which appear to move into the level which is being played may be represented as described in relation to the representations of James and John.

In some embodiments, the representations of the other users will appear one at a time on the display before increasing the number of moves and being removed from the display. In some embodiments, all of the representations may be moving at the same time to increase the move values from for example 26 to 28 in one step.

It should be appreciated that there are many other ways in which the game area can be displayed such that the user is able to make the connection between the fact that a friend is playing on a nearby level and the fact that the friend appears to increase the number of moves, for example, which the player has available.

It should be appreciated that the game area will also include game objects (not shown) or the like for game play.

In some embodiments, when a game is selected for playing, this may launch the game and cause a map to be displayed showing at least some of the levels which are available for playing. To start playing the game, the user may select a level to play. This map view may allow a user to navigate easily between the levels and select the level to be played.

Figure 3:
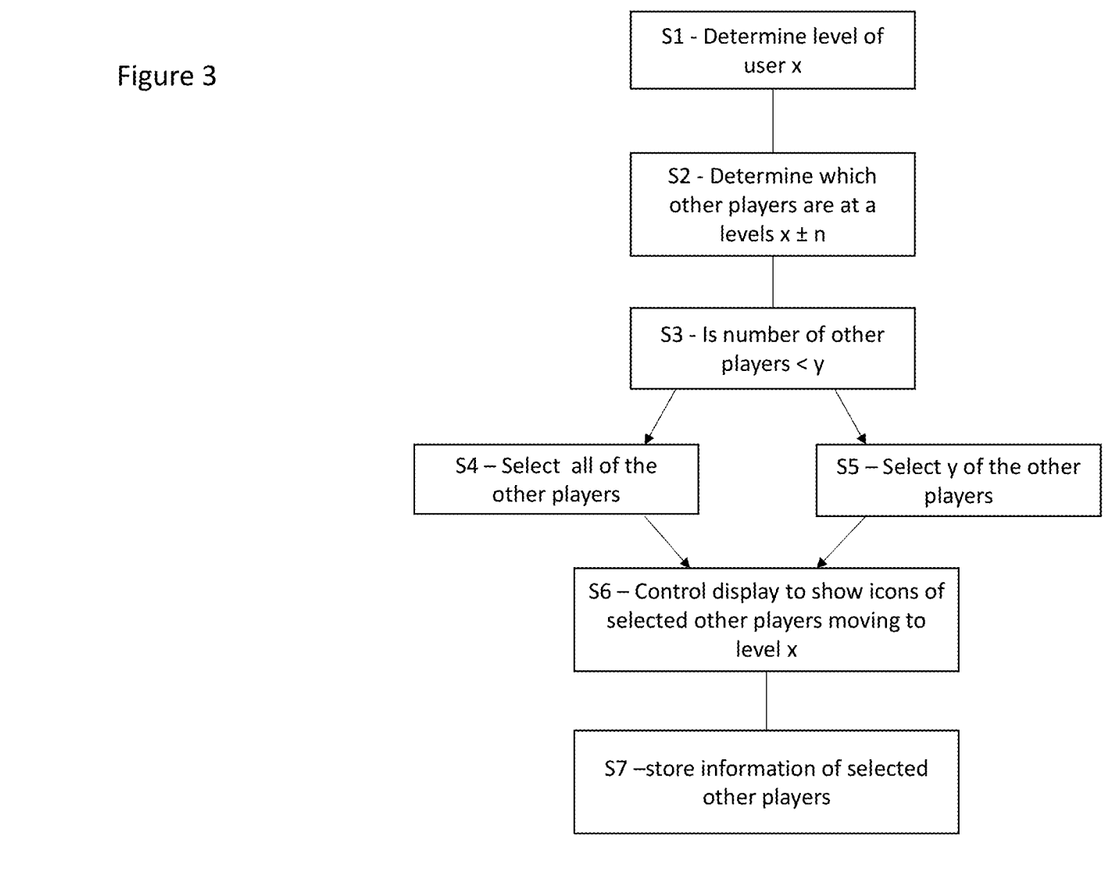
FIG. 3 is a first flow chart showing steps performed in a user device.

Reference is made to FIG. 3 which shows a flow chart for determining which other players are to be selected to appear to provide assistance to the player.

In step S1, a determination is made by at least one processor of the user device as to the level of the computer implemented game which a player has selected. This level is designated as level x. In the example shown in FIGS. 1A and 1B, the value of x is 3 as the user has reached level 3. This may be the latest level which the user has reached or may be any other different level. The levels which it is possible for the user to select may be defined by the game code which is run by the game engine.

In step S2, it is determined by the at least one processor which other players or friends are at levels which are x+/−n where n is an integer. The value of n may be any suitable value. In some embodiments, it is desirable for the user to feel that he is playing the game along with his friends so n may be relatively small. The at least one processor will have access to information received from the server which is stored in at least one memory. This information will include information identifying for each friend, the level which that friend has reached and information defining the representation of that user which is to be displayed on the display. It should be appreciated that this information will be updated. This information is updated in response to update information received from the server.

In some embodiments, the value of n may reflect the number of levels which can be displayed normally on the display. For example, in the simple example of FIG. 1A, n may have the value of 2. However, this value of n is by way of example only and n may have any other suitable value.

In some embodiments, the value of n may be selected in dependence on the number of friends which a player has. The larger the number of friends of the player, the smaller the value of n and vice versa.

Reference has been made to determining the friends at levels which are x+/−n. In other embodiments, it may be determined which friend are at levels n1<x<n2. Both n1 and n2 are integers which may be the same or which may be different. In some embodiments n1 may be larger than n2 or vice versa.

It should be appreciated that the value of n or n1 and n2 may be different for different levels of the same game.

In some embodiments, step S2 may be omitted.

In step S3, it is determined if the number of other players or friends is less than (or optionally equal to) a value of y. Other embodiments may look instead at whether the number of other players is greater than y. It should be appreciated that the value of y may be the same for all levels or may be different for one or more other levels.

In some embodiments, the number of other players which can provide in game system assistance to the player may be limited to ensure that a game still provides challenges to a player.

It should be appreciated that in other embodiments, the number of other players which are selected may not be limited but the number of extra moves or assistance may be limited.

If it is determined in step S3 that the number of other players is less than y, then the next step is step S4. All of the other players are selected to provide the set of other players causing the provision of in game assistance.

If it is determined that the number of other players is greater than y, then a subset of those other users is selected in step S5. This is so as to provide a set of y users to provide in game assistance to the user.

If there are y users, some embodiments will select step S4 are the next step and other embodiments will select step S5 as the next step.

Both steps S4 and S5 are followed by step S6. In this step, the display is controlled by the least one processor to show representations of the other players moving to level x. This, is for example as described in relation to FIGS. 1a and 1b. These are the other players which have been selected in step S4 or S5.

In the step S7, information may be stored in memory to define the selected other players. This may be done at the same time as steps S4, S5 or S6 in some embodiments.

It should be appreciated that FIG. 3 shows one example in which a set of other players may be selected to provide in game assistance to the player of the game.

In other embodiments, the y closest other players to the level which is currently being played by the user may be selected.

In some embodiments, there may be a limit as to the maximum difference in level between the level currently being played and a level being played by another player.

In some embodiments, a game may have a plurality of sets of levels. Each of the sets of levels may be defined as an episode. In some embodiments, only users which are in the same subset of the levels as the current user may be displayed.

Figure 4:
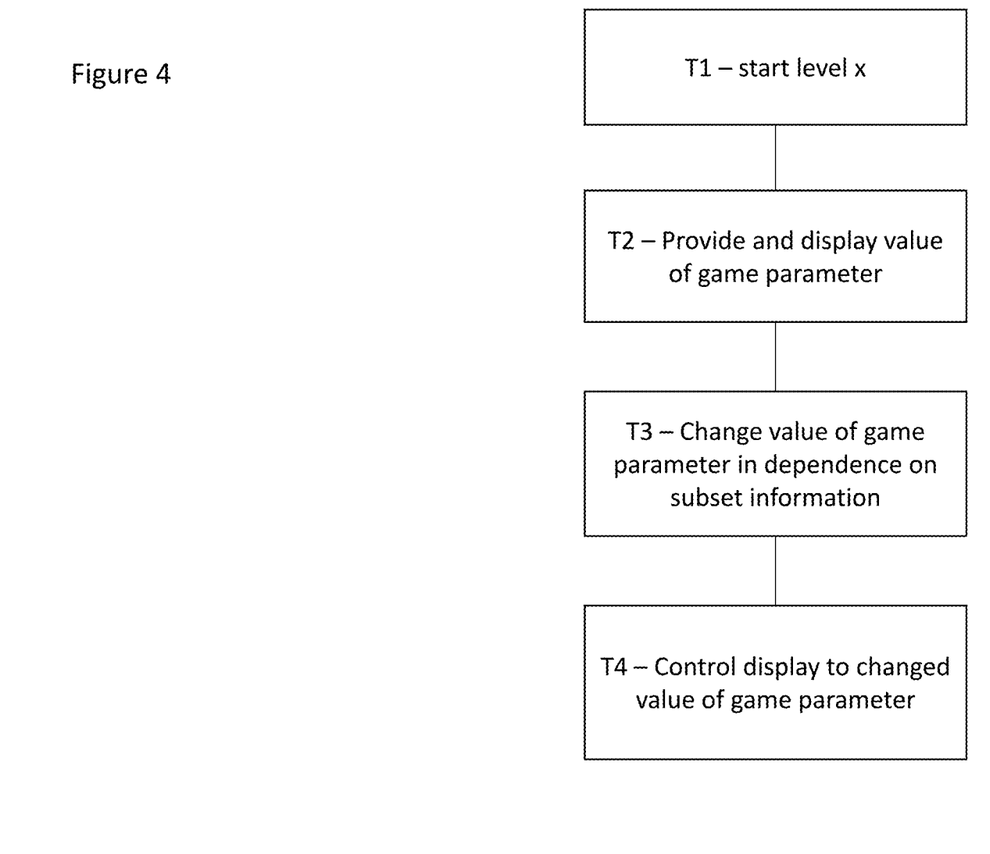
FIG. 4 is a second flow chart showing steps performed in a user device.

Reference is now made to FIG. 4 which shows a generalised flow for the provision of the in game assistance from the other players.

In step T1, the at least one processor is configured to start the game of the level selected in step S1 of FIG. 3.

In step T2, the at least one processor, in response to the starting of the game associated with level x, will obtain and display the value of a game parameter. This value may be defined by the programme code for the game. The at least one processer may obtain or determine this information from the game code. The game code may be stored in memory and executed by the at least one processor. In practice, the game code will cause this value to be provided and displayed on the display.

In step T3, the value of the game parameter will be changed in dependence on the selected other player information, for example as determined using the flow of FIG. 3 or otherwise determined.

In step T4, the processor will cause the display to be controlled in order to display a changed value of the game parameter. The value may be increased or decreased.

Figure 5:
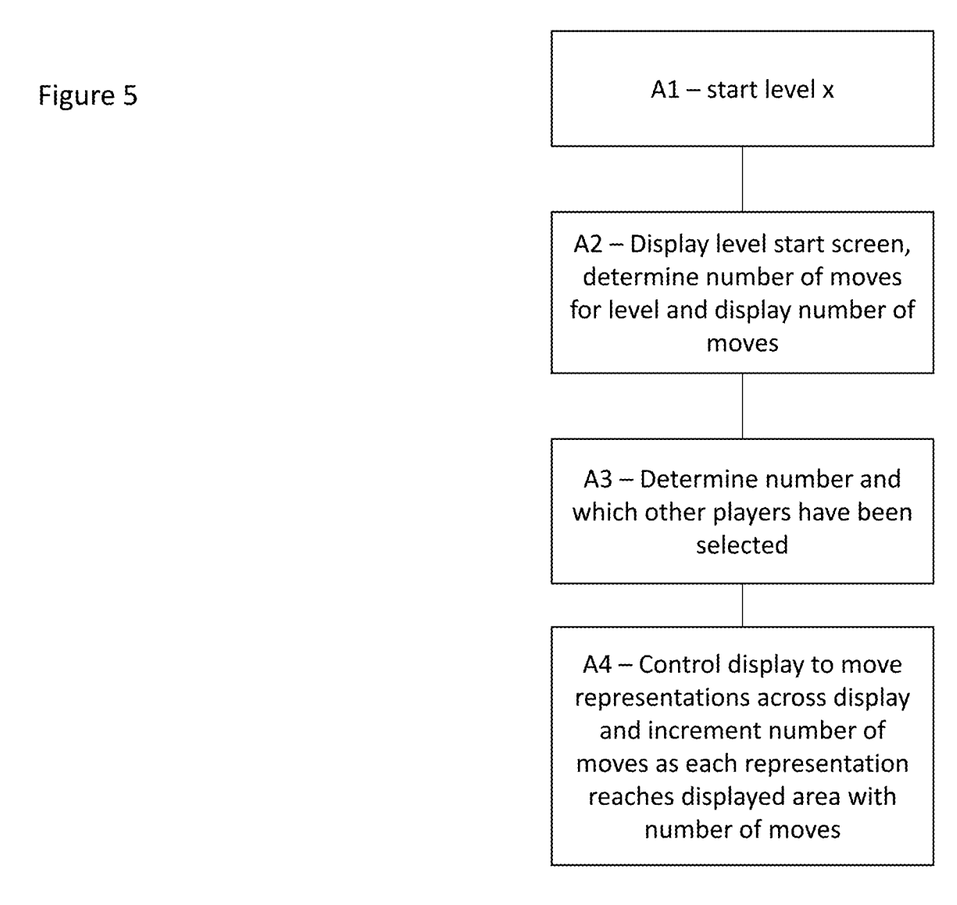
FIG. 5 is a third flow chart showing steps performed in a user device.

Reference is made to FIG. 5 which shows an example flow where the game parameter is number of moves.

In step A1, the at least one processor is configured to start the game of the level selected. This is as described in step T1 of FIG. 4.

In step A2, the at least one processer is configured to control the display to display the start screen for the selected level of the game. The number of moves for the level is determined and displayed. As mentioned previously, the number of moves may be determined from the program code which is executed by the at least one processor.

In step A3, the at least one processor is configured to determine the number of other players which have been selected and which other players have been selected. In some embodiments where there are always a predetermined number of other players selected, the determining of the number of other players may be omitted.

In step A4, the at least one processor is configured to control the display such that the representations of the other players are moved across the display to the area showing the number of moves. It should be appreciated that in some embodiments, the controlling of the representations of the other players to move across the display to the area where the number of moves is displayed is optional.

The number of moves displayed is incremented as each representation reaches the area which displays the available number of moves. The number of moves is incremented in the displayed image and in the memory. The stored value of the number of moves is used by the at least one processor to control gameplay.

In some embodiments, the value of the number of moves is updated to change the moves in dependence on the number of selected other players.

It should be appreciated that when one of the friends of the player himself plays the game, the same mechanism will be in place. Accordingly, although the different players are not playing the same game, a perceived interaction between the different players can be achieved. In game assistance is provided from other users which are playing the game and those other users themselves will also get extra assistance.

In some embodiments, where there are a relatively large number of friends of the user which satisfy the selection criteria, the friends may be selected at random.

In some embodiments, a sub set of friends or players may be defined and those players may define a group. Information defining that group may be stored. Accordingly, when other members of that group play the same game, those other players will receive in game assistance from the other members of the group.

In some embodiments, where there is a selection of a subset of friends or players, the selection may be made on any suitable criteria. The selection may be dependent on one or more of: how close the level of another player is to the level being played; if the level of another player is before or after the level being played; if another player is playing or has recently played; if there has been an interaction between another player and the player of the game; where there has been an interaction how recent that interaction has been; if the another player has been invited by the current player to play the game; where another player has been invited to play the game, how recent that invitation has been.

The interaction may be any suitable interaction such as causing a message or gift to be sent and/or received.

In other embodiments, messaging may be used such that the player may be invited and/or invite another player to join his group. This may require a message to be sent to another user via one or more games server and/or a message to be received via the one or more game server.

In some embodiments, there may be a limit as to the amount of in game assistance provided. For example, a user may be limited to having 5 or some other number of extra moves. It should be appreciated that the limit of assistance will of course depend on the game.

In some embodiments, the limit on the amount of assistance may be dependent on the level being played.

In some embodiments, the limit on the amount of assistance may alternatively or additionally be varied over time. The limit on the amount of assistance may be randomly changed. In some embodiments, the limit on the amount of assistance may be dependent on the spread of levels of the friends in a group.

It should be appreciated that one or more factors may be used to control the limit on the amount of assistance.

It should be appreciated that the limit on the amount of assistance may be done directly in the sense that it is independent of the number of friends. Alternatively the limit on the amount of assistance may be controlled by controlling the number of friends or other players in the subset.

In some embodiments, a bidirectional relationship may be established between two users such that they are able to help one another as they progress through the same or similar levels of the game.

As mentioned previously, the in game assistance may be any suitable in game assistance.

Figure 8:
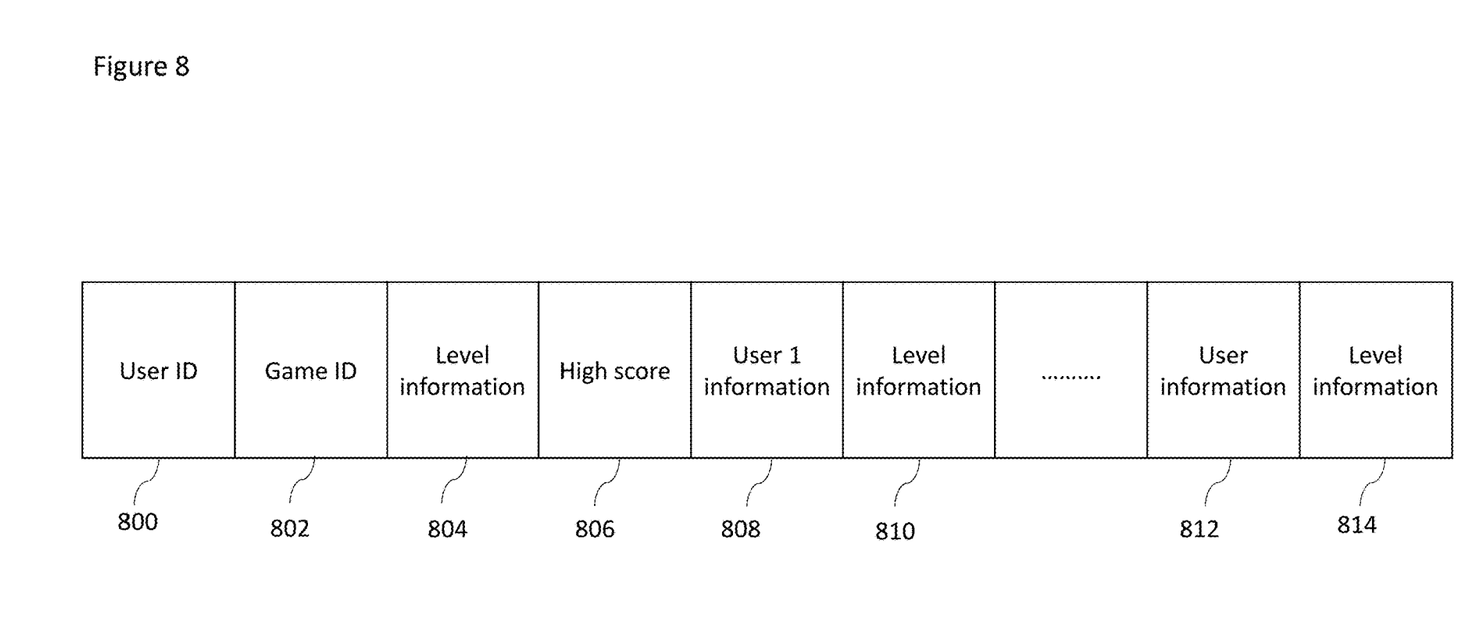
FIG. 8 shows a data structure used in some embodiments.

Reference is made to FIG. 8 which shows a data structure used in some embodiments. The data structure is associated with a player of a game.

The data structure comprises a field 800 having user identity information. This information identifies the user.

Game identity information is provided in field 802 and provides information on the game which is being played by the user.

Field 804 comprises level information and has information on the level which has been achieved by the user in the game identified in field 802.

Field 806 may provide information on a high score achieved by a user. This may be information associated with a number of different levels and may include respective information identifying the level.

Field 808 comprises information identifying a first user, user 1. This is a first friend of the user. This information may include information including representation information.

Field 810 provides level information associated with the first user. This indicates where the first user has got to in the game identified in field 802.

It should be appreciated that up to n different users may be identified in the data structure. For each user, user information 812 and associated level information 814 is provided, as described in relation to the first user.

The data structure is shown in FIG. 8 may be available to the user device and may be stored in memory on the user device.

This information may alternatively or additionally be provided in a server.

Information updating one or more of the users may be received from the server. For example, the identities of the users may change, the number of users may change and the level information may need to be updated in dependence on the progress made by the respective user when playing the game.

In some embodiments, the other users may be selected for the player and may not be friends or otherwise connected to the user.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. The memory is any suitable data store and may be a buffer, a register, RAM or any suitable data store.

Some embodiments may be provided by a computer program running on the at least one processor. The computer program may comprise computer implemented instructions which are stored in the at least one memory and which may be run on the at least one processor. A computer program product may be provided which comprises computer program product comprising code embodied on a computer-readable medium which is configured to be executed on a processor of the computer or user device. In some embodiments, a non-transitory computer readable storage device may be provided to store program code instructions that, when executed by at least one processor causes any of the above described methods to be performed.

A person skilled in the art will realise that the different approaches to implementing the game is not exhaustive, what is described herein are certain preferred embodiments. It is possible to implement the way in a number of variations without departing from the scope of the invention as claimed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer device having:
a display configured to display a game area for a computer implemented game, the computer implemented game having a plurality of levels, each of the levels having an associated objective;
a user interface configured to detect user input when a first user engages with the game area;
a memory storing information about one or more other users and respective level progress information associated with the one or more other users, the level progress information including a respective level for a respective user; and
at least one processor configured to:
receive a detected user input from the first user to play a given level of the computer implemented game, the given level of the computer implemented game having a default number of moves available when playing that given level,
modify, in response to receiving the detected user input to play the given level of the computer implemented game, the default number of moves to a modified number of moves available when playing that given level which is different to the default number of moves, the modification of the number of moves being dependent on a number of users of the one or more other users,
cause the display to display a representation of at least one user of the number of users moving to the given level and a value of the number of moves changing from the default number of moves to the modified number of moves, and
use the modified number of moves instead of the default number of moves when the first user plays the given level of the computer implemented game.

2. The computer device as claimed in claim 1, wherein the at least one processor is configured to determine the number of other users in dependence on the stored information about at least one other user and the respective level associated with the at least one other user.

3. The computer device as claimed in claim 2, wherein the at least one processor is configured to select a respective other user as one of the determined number of other users if the at least one processor determines that a difference between the given level of the computer implemented game of the first user and the level of the respective other user is less than a threshold.

4. The computer device as claimed in claim 1, wherein the at least one processor is configured to cause the display to display the value of the number of available moves increasing from the default number of moves to the modified number of moves.

5. The computer device as claimed in claim 1, wherein the at least one processor is configured to increase the default number of moves to the modified number of moves, the number of moves increasing in dependence on the number of other users.

6. The computer device as claimed in claim 1, wherein the at least one processor is configured to increase the default number of moves to the modified number of moves, the number of moves increasing by the number of other users.

7. The computer device as claimed in claim 1, wherein the at least one processor is configured to change the value of the number of moves displayed such that the displayed value changes as each displayed representation reaches the given level.

8. The computer device as claimed in claim 1, wherein the at least one processor is configured to change the value of the number of moves displayed such that the displayed value is incremented as each displayed representation reaches the given level.

9. The computer device as claimed in claim 8, wherein the at least one processor is configured to control the display to display the representation of at least one other user moving from a respective current level to the given level of the first user.

10. The computer device as claimed in claim 1, wherein the at least one processor is configured to increase the default number of moves to the modified number of moves, the number of moves increasing in dependence on the number of other users, up to a maximum number of moves.

11. The computer device as claimed in claim 1, wherein the at least one processor is configured to control the display to display a first game area in which a plurality of available levels of the game are displayed and respective representations indicating for the first user and at least one other user a respective current level.

12. The computer device as claimed in claim 1, comprising a receiver configured to receive at least one of the information about the at least one other user and the respective progress information.

13. The computer device as claimed in claim 1, wherein the at least one processor is configured to start the game in response to the detected user input to start the game and to display a second game area, the second game area comprising an area to display the number of moves.

14. A computer-readable non-transitory storage medium carrying one or more sequences of instructions when executed on a processor of a computer, cause:
- displaying on a display a game area for a computer implemented game, the computer implemented game having a plurality of levels, each of the levels having an associated objective;
- detection of user input at a user interface when a first user engages with the game area, the user input selecting a given level of the computer implemented game, the given level of the computer implemented game having a default number of moves available when that given level is played;
- modifying the default number of moves to a modified number of moves available when playing that given level which is different to the default number of moves, the modification of the number of moves being dependent on a number of users of the one or more other users;
- causing the display to display a representation of at least one user of the number of users moving to the given level and a value of the number of moves changing from the default number of moves to the modified number of moves; and
- using the modified number of moves instead of the default number of moves when the first user plays the given level of the computer implemented game.

15. A computer implemented method comprising:
- displaying on a display a game area for a computer implemented game, the computer implemented game having a plurality of levels, each of the levels having an associated objective;
- detecting user input at a user interface when a first user engages with the game area, the user input selecting a given level of the computer implemented game, the given level of the computer implemented game having a default number of moves available when playing that given level;
- storing information in a memory about one or more other users and respective level progress information associated with the one or more other users, the level progress information including a respective level for a respective user;
- modifying by at least one processor, in response to receiving the detected user input to play the given level of the computer implemented game, the default number of moves to provide a modified number of moves available when playing that given level which is different to the default number of moves, the modification of the number of moves being dependent on a number of users of the one or more other users;
- causing, by the at least one processor, the display to display a representation of at least one user of the number of users moving to the given level and a value of the number of moves changing from the default number of moves to the modified number of moves; and
- using, by the at least one processor, the modified number of moves instead of the default number of moves when the first user plays the given level of the computer implemented game.

16. The computer implemented method as claimed in claim 15, comprising determining by the at least one processor, the number of other users in dependence on the stored information about at least one other user and the respective level associated with the at least one other user.

17. The computer implemented method as claimed in claim 16, comprising selecting, by the at least one processor, a respective other user as one of the determined number of other users if a difference between the given level of the computer implemented game of the first user and the level of the respective other user is less than a threshold.

18. The computer implemented method as claimed in claim 15, comprising causing, by the at least one processor, the display to display the value of the number of available moves increasing from the default number of moves to the modified number of moves.

19. The computer implemented method as claimed in claim 15, comprising increasing, by the at least one processor, the default number of moves to the modified number of moves, the number of moves increasing by the number of other users.

20. The computer implemented method as claimed in claim 15, comprising causing, by the at least one processor, the display to display the value of the number of available moves changing as each displayed representation reaches the given level.

21. The computer implemented method as claimed in claim 15, comprising increasing, by the at least one processor, the default number of moves to the modified number of moves, the number of moves increasing by the number of other users, up to a maximum number of moves.

22. The computer implemented method as claimed in claim 15, comprising controlling, by the at least one processor, the display to display a first game area in which a plurality of available levels of the game are displayed and respective representations indicating for the first user and at least one other user a respective current level.

23. The computer implemented method as claimed in claim 15, comprising controlling, by the at least one processor, the display to display the representation of at least one other user moving from a respective current level of that respective other user to the given level of the first user.

24. The computer implemented method as claimed in claim 15, comprising starting, by the at least one processor, the game in response to the detected user input to start the game, and displaying a second game area, the second game area comprising an area to display the number of moves.

* * * * *